March 29, 1960 K. W. SAVAGE ET AL 2,930,260
INDEXING MECHANISM
Filed April 11, 1958 3 Sheets-Sheet 1

INVENTORS
KENNETH W SAVAGE
LEONARD H. SAVAGE
BY
Woodhams Blanchard and Flynn
ATTORNEYS March 29, 1960 K. W. SAVAGE ET AL 2,930,260
INDEXING MECHANISM Filed April 11, 1958 3 Sheets-Sheet 2

INVENTORS
KENNETH W. SAVAGE
LEONARD H. SAVAGE
BY
Woodhams Blanchard and Flynn
ATTORNEYS

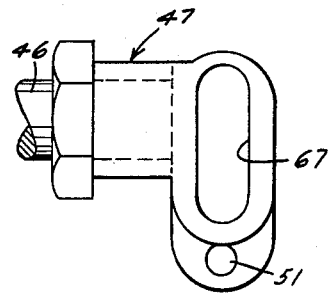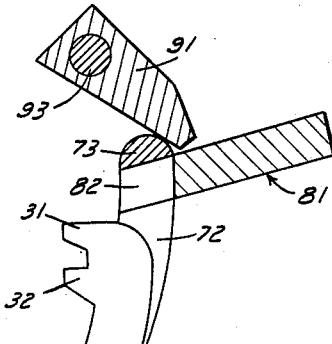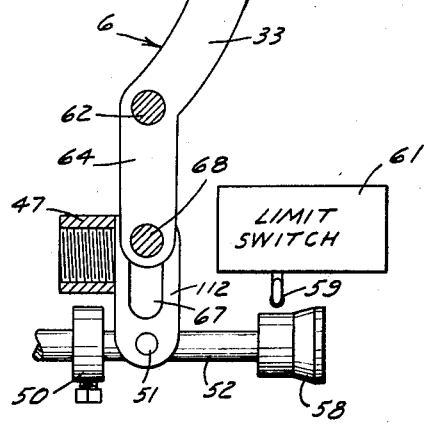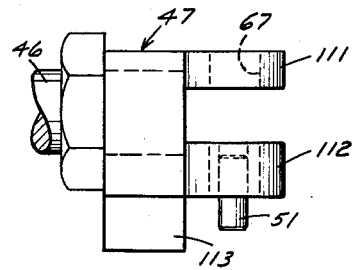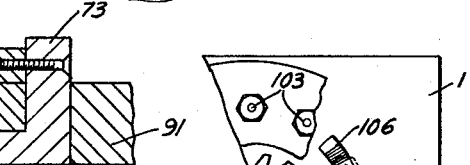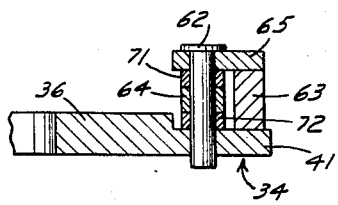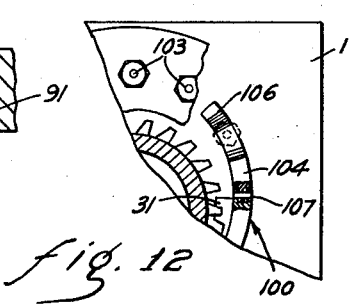

United States Patent Office 2,930,260
Patented Mar. 29, 1960

2,930,260

INDEXING MECHANISM

Kenneth W. Savage, Grandville, and Leonard H. Savage, Grand Rapids, Mich., assignors to The Lithibar Company, Holland, Mich., a corporation of Michigan Application April 11, 1958, Serial No. 727,820

9 Claims. (Cl. 74—815)

This invention relates to indexing mechanism and particularly to a type of indexing mechanism which is freely and accurately adjustable for effecting indexing through a plurality of selectable, and adjustable, stations.

In many types of machine tool operations, the use of indexing equipment has been common for a great many years. However, in such apparatus it is well understood that the locating of each station with respect to the indexing mechanism requires great accuracy in order to maintain the accuracy of the finished product. This problem has been handled in a large variety of different ways, and in many instances the previous methods of handling the problem have been acceptable, as evidenced by the wide and efficient use of turret mechanism in a multitude of present-day industrial purposes, both in the machine tool field and in many other fields, such as in bottle filling apparatus. However, in most of these present devices the means by which the particular stations are located with respect to the indexing mechanism are of such fixed character that it becomes extremely difficult, if not impossible, to adjust the position of a station if the mechanism has not been made exactly correctly, if the parts have become worn, or if the design of the product has changed. Particularly, in present-day turret indexing apparatus, it is relatively difficult to provide indexing mechanism for handling unevenly spaced stations, most indexing mechanism being based upon the assumption that the stations will be evenly spaced and are constructed accordingly. Thus, where unevenly spaced stations are required, as in the boring of a plurality of unevenly spaced holes into a casting, the industry has usually depended on some type of cam, or other special mechanism, which will provide the desired pattern of operation. However, such mechanism is fixed to a given pattern of operation, and when it is desired to change the pattern of operation, a different special mechanism must be provided.

It has therefore long been desirable to provide some type of actuating or timing mechanism for an indexing table by which the table can be indexed to any desired pattern of indexing sequences, such pattern can be modified, adjusted or corrected as desired at any time subsequent to the original setting thereof and yet which will at least maintain the same degree of accuracy with respect to a particular predetermined pattern as is now obtained by conventional devices.

Accordingly, a major object of the invention has been to provide actuating mechanism for an indexing device capable of adjustment to follow any desired indexing pattern of spacing between stations and which mechanism will be adjustable as desired at any time after the original setting thereof.

Further objects of the invention are to provide such an apparatus capable of:

(1) Attaining and maintaining the same degree of accuracy in spacing between stations as is attainable by present conventional devices;

(2) Being adjusted for any spacing pattern desired without disturbing or disassembling any of the mechanism and without disturbing any part of the mechanism other than the specific adjustment devices concerned;

(3) Effecting the foregoing objectives by equipment which is relatively inexpensive in both original cost and in maintenance;

(4) Correcting or readjusting any station without affecting existing adjustments with respect to other stations;

(5) Being applied to a wide variety of different indexing machines without material variation in the design of the indexing apparatus;

(6) Having brake mechanism which will apply a brake to the rotative table simultaneously with completion of each indexing rotation; and (7) Having a high degree of stability so that when it is once placed into a selected adjusted position, it will remain in that position for a long period of time.

Other objects and purposes will be apparent to persons acquainted with devices of the general type upon reading the following disclosure and inspection of the accompanying drawings.

In the drawings:

Figure 5 is a section taken on the line V—V of Figure 2.

Figure 7 is a detail of the upper side of the fitting shown in Figure 6 with the associated mechanism removed therefrom.

Figure 8 is a side view of the fitting shown in Figure 7.

Figure 9 is a section taken on the line IX—IX of Figure 1.

Figure 10 is a section taken on the line X—X of Figure 1.

Figure 12 is a top view of a fragment of the apparatus with portions of the indexing table broken away, and showing the modification of the invention.

*General description*

Figure 1:
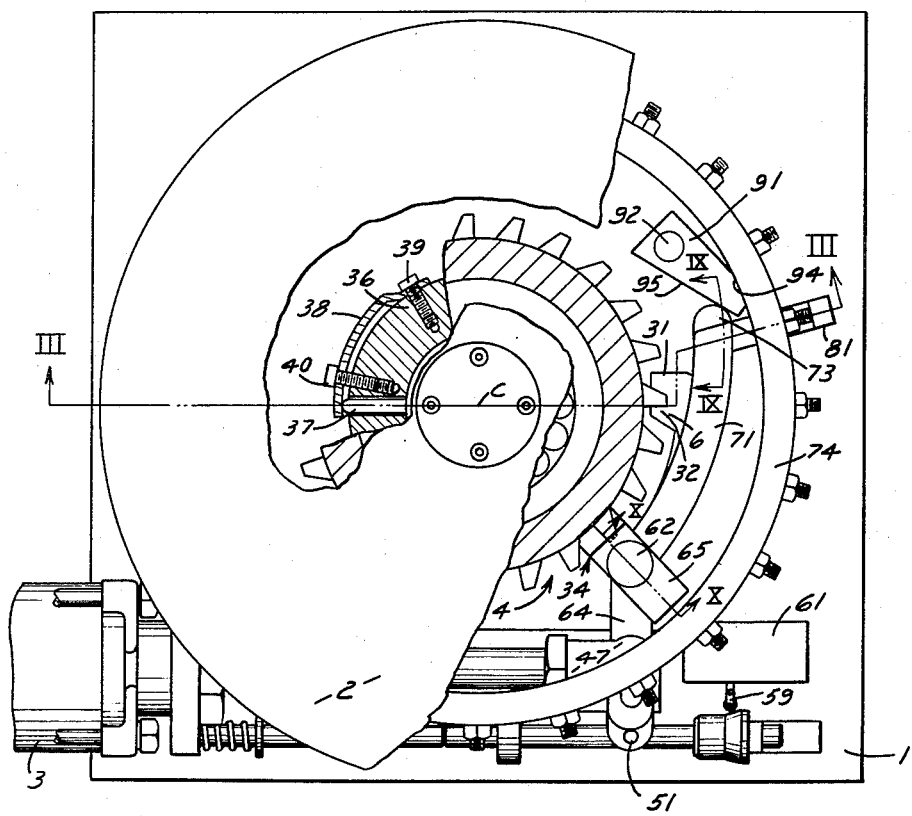
Figure 1 is a top view of apparatus embodying the invention with portions of the indexing table broken away to show the mechanism operating same.
Figure 2:
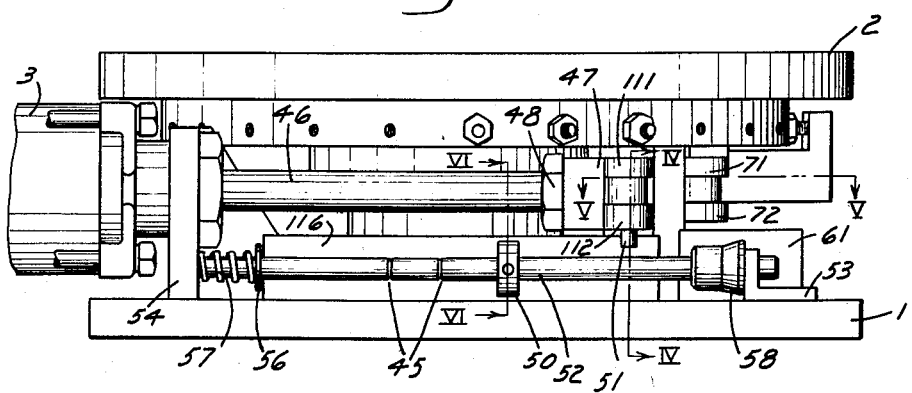
Figure 2 is an end elevational view of the apparatus shown in Figure 1.

In general, the invention comprises providing a ratchet and pawl of a generally conventional nature for operating the indexing table but providing in association with the pawl a continuously variable device for limiting the angular rotation effected by the pawl in a given indexing operation. More specifically, and with particular reference to the disclosed embodiment, a plurality of radially arranged screws are associated with the indexing table and such screws are each positioned respectively in a predetermined relationship with the teeth of the ratchet by which the table is turned. A rotation limiting device is fastened to and extends from the pawl and engages a predeterminable one of said screws each time the pawl engages a tooth of the ratchet. Simultaneously, a portion of said rotation limiting device engages the slope of a cam and travels therealong a distance determined by the radial position thereof which in turn is determined by the adjustment of the screw. Thus, the exact amount by which the pawl will move the ratchet as it engages any given tooth is determined by the adjustment of the radial screw associated with said tooth. A continuous, or following, force is applied to the pawl so that it will urge rotation of the ratchet until same is stopped by engagement of the rotation limiting device solidly against the surface of the cam.

*Detailed description*

While the apparatus of the invention, both the specific embodiment here disclosed and a wide variety of other possible embodiments which will be obvious in view of the present disclosure, are applicable in a large number of specific uses, it will for illustrative purposes be assumed that the present device is applied to a turret device which is intended to present a casting to a drill for the drilling thereinto of a number of unequally spaced holes. Insofar as the invention is concerned, however, the indexing table could as well be carrying a plurality of bottles through a series of filling and stoppering operations which, for reasons incident to the particular material being inserted into the bottles, require that the stations be unequally spaced from each other.

Further, to promote convenience in description it will be understood that terms such as "upward" and "downward" and their derivatives as well as terms of similar import will refer to the mechanism in its normal position of operation, namely, with the indexing table in a horizontal position. Such terminology will also refer to directions appearing in individual drawings and with reference to the normal position of such drawings. The terms "rightward" and "leftward" and derivatives together with terms of similar import will refer to directions with respect to figures of the drawings under consideration at the time such terminology is used. The terms "inward" and "outward" will refer to directions toward and away from the geometric center of the apparatus. Such terms will be recognized as descriptive only and not limiting.

Turning now to the drawings, there is shown a base plate 1 on which is mounted a rotatable indexing table 2, whose indexing is effected stepwise by any suitable driving mechanism, such as a cylinder 3 responsive to the application of pressure fluid. A ratchet 4 is fixed nonrotatably with respect to the table for being driven by the pawl 6.

Figure 3:
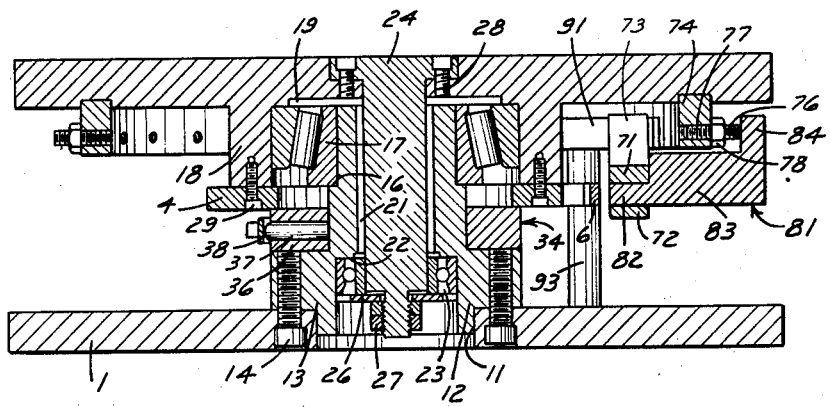
Figure 3 is a sectional view taken on the line III—III of Figure 1.
Figure 6:
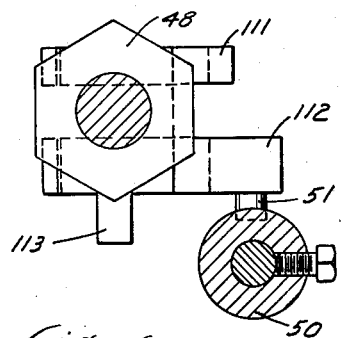
Figure 6 is a section taken on the line VI—VI of Figure 2.
Figure 4:
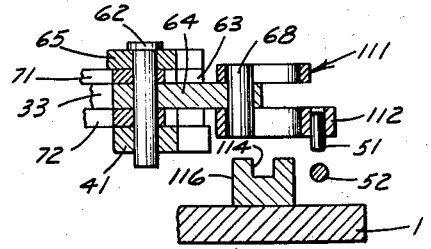
Figure 4 is a section taken on the line IV—IV of Figure 2.

More specifically, the base 1 has a central opening 11 (Figure 3) therein into which is piloted a hollow upstanding post 12, which post is fastened by its flange 13 and screws, of which one is shown at 14, onto the base 1. The post 12 has an upwardly facing shoulder 16 near its upper end for supporting a combined radial and thrust bearing 17 which bearing in turn supports the table 2 through the down hanging flange 18 thereof. An offset 19 is provided within the central portion of the table to provide ample clearance between the lower side of the table and the bearing and post structure. The lower end of the central opening 21 within said post is provided with a shoulder 22 for the reception of the bearing structure 23, said bearing structure receiving and guiding the pivot shaft 24 which is coaxial with and extends downwardly from the table 2. A washer 26 backed by lock nuts 27 tightens the shaft 24 with respect to the bearing 23 in order to eliminate any possible play which otherwise might exist between said shaft and the frame structure on which the bearings are mounted. The shaft 24 is in this instance shown as fastened by screws 28 to the table 2.

The ratchet wheel 4 is located immediately under the flange 18 and is fastened thereto by screws of which one appears at 29.

The pawl 6 includes a pair of jaws 31 and 32 shaped for snug fitting over the respective teeth of the ratchet wheel 4 and includes an arm 33 pivotally mounted upon the pawl driver 34. Said pawl driver includes a ring portion 36 extending snugly around the midportion of the post 12 and includes also a drag pin 37 arranged radially therewithin. A spring 38 is secured to the ring 36 by the screw 39 and adjustably tensioned by the screw 40 to bear against the pin 37 and urge it resiliently against the periphery of the post 12. Thus, the ring 36 is maintained in a snug fit with respect to the post 12 and no looseness or play can occur. The ring 36 of the pawl driver has an arm 41 extending sidewardly therefrom.

Any suitable means may be provided for driving the pawl driver 34 from the external source of power, in this embodiment the cylinder 3, and the following described parts are described primarily for the purpose of showing a complete and fully operative device.

The cylinder 3 has a reciprocable rod 46 extending therefrom, which rod has a fixture 47 threaded thereon. A lock nut 48 secures the fixture 47 firmly in place on the rod. The fixture has a pair of vertically spaced, sidewardly extending ears 111 and 112. The ears 111 and 112 have aligned slots 67 therein and ear 112 has a pin 51 extending downwardly therefrom for purposes appearing in the following description.

A control rod 52 located parallel with rod 46 is slidably mounted on the base plate 11 for movement parallel with the rod 46. The rod 52 is supported in any convenient manner such as by brackets 53 and 54 and is slidable through openings therein. The bracket 54 may also support the cylinder 3 and the cylinder rod 46 extending therefrom on the base plate 1. A plate 56 is fixed rigidly onto the rod 52 and a spring 57 is placed between the bracket 54 and the plate 56 for resiliently urging the rod 52 in a rightward (as appearing in the drawings) direction. A cam 58 is affixed to the rod 52, preferably in a manner to permit axial movement of said cam along said rod for adjustment purposes. The cam 58 cooperates with the actuator 59 (Figure 1) of a limit switch 61 for purposes appearing hereinafter.

A plurality of axially spaced grooves 45 are provided on the rod 52. A stop mechanism 50 is mounted on the rod 52 and is releasably fixed thereto at a selected point thereon, which selected point will normally be at one of the grooves 45.

The arm 41 of the pawl driver 34 has a spacer 63 secured thereto at its outer end. A block 65 is mounted on the upper end of spacer 63 and is parallel with arm 41. The arm 33 and the hereinafter described limit control arms 71 and 72 are pivotally supported by a pivot pin 62 which extends between the arm 41 and the block 65. The arm 33 has an extension 64 extending sidewardly therefrom. The extension 64 is received between ears 111 and 112 of the fixture 47 and a vertically extending drive pin 68 is secured to said extension and is slidably received in the aligned slots 67 in said ears. Thus, the arm 33 and extension 64 define a lever which is pivotable about pin 62 upon axial movement of the piston rod 46.

A lug 113 extends downwardly from the fixture 47 and is slidably received in the slot 114 in the guide 116 for providing support and guidance for axial movement of the fixture 47. It will be observed that the pivot pin 62 is drivingly connected by the ring 36 to the drive pin 68. Since the pin 68 is slidably transversely within slots 67, the pin 62 is free to pivot with ring 36 in response to axial movement of piston rod 46. By this arrangement, reciprocal motion of the rod 46, resulting in corresponding reciprocal motion of the pin 68 will pivot the arm 33 into and out of engagement with the teeth of the ratchet wheel and will simultaneously move the pivot pin 62 around the axis defined by the center of the post 12 to effect an oscillation of the entire pawl 6 including arm 64 around the same center and thereby effect a stepwise driving of the ratchet wheel 4.

Associated with the pawl 6 are a pair of limit control arms 71 and 72 which are arranged, respectively, above and below the arm 33 of the pawl 6 and are mounted as above described. These arms extend to a point circumferentially beyond the jaw end of the pawl 6 where they are provided with and connected together by an upstanding cam follower 73.

Near the outer periphery, and radially outwardly (in this embodiment) of the cam follower 73 is a downwardly extending flange 74 extending around the whole circumference of the indexing table. Located at suitable intervals around the circumferential extent of the flange 74 are a plurality of screws 76 which are threadedly received into openings 77 within the flange 74 and which are locked in place by a lock nut 78. The screws 76 are in the present embodiment equal in number to the number of teeth on the ratchet wheel 4 and are in this embodiment spaced equally from each other a distance substantially equal to the spacing of the teeth of the ratchet wheel 4.

Located near the cam follower 73 and mounted in fixed position with respect thereto is a cam limit structure 81. The cam limit structure 81 has a lug 82 thereon extending between and secured, as by welding, to the arms 71 and 72. The cam limit structure 81 also has a body portion 83 extending to a point radially outwardly of the flange 74 and has an upwardly extending portion 84 extending to a point in horizontal alignment with the screws 76. The positioning of said cam limit structure 81 with respect to the arms 71 and 72, the screws 76, the pawl 6 and the teeth of the ratchet wheel 4 is such that when the jaws 31 and 32 of the cam are in engagement with a tooth of the ratchet wheel 4, the upstanding portion 84 will be in radial alignment with one of the screws 76.

A cam 91 is positioned within the circular flange 74 and is pivotally supported at 92 upon a post 93 which is rigidly affixed to the base 1. In this embodiment the surface 94 of the cam is arranged for contacting the inner surface of the flange 74 and to act as a brake shoe thereagainst. Either the inner surface of the flange 74 or the surface 94 of the cam may be provided with wear resistant and/or braking material if desired. The slope of the cam surface 95 is such with respect to the circumferential movement of the cam follower 73 about the center of the pin 62 that a given amount of radially inward or outward movement of the cam 73 will result in its contacting the cam surface 95 at substantially different circumferentially located positions with respect to the center line C of the apparatus. The cam surface 95 advantageously extends at about 45 degrees with respect to any radius of the table through said cam surface but the exact amount of such angle is somewhat a matter of choice and design.

*Operation*

Turning now to the operation of the device above described, reference will first be made to the operation of the pawl operating mechanism followed by consideration of the rotation adjusting and limiting mechanisms.

Assuming the parts to be in the position shown in Figure 1 of the drawings which is at the end of a driving stroke of the rod 46, suitable means in the cylinder 3 will move said rod in a leftward direction. This will urge the pin 68 against the leftward side of slot 67 and thereby effect a clockwise (as appearing in Figure 1) rotation of the pawl 6 around the pivot pin 62 whereby the jaws 31 and 32 are released from engagement with the tooth shown in engagement in Figure 1. When the jaws 31 and 32 are released, the cam follower 73 will move substantially into engagement with the interior surface of flange 74. Simultaneously, the pin 68 will pull the extension 64 which will act through the pivot pin 62 to pull the arm 41 of the pawl driver 34 to effect a clockwise rotation of said pawl driver, including the ring 36, with respect to table 2. This rotation continues until the pin 51 strikes the stop 50 which then effects a leftward movement of the rod 52 which in turn causes the cam 58 to engage the actuator 59 of the limit switch 61. When the limit switch 61 is thus actuated, it operates, through suitable connections (not shown), an electro-responsive device controlling the supply of pressure fluid to the cylinder 3 to make available a supply of pressure fluid for introduction into the leftward end of said cylinder. The pressure fluid may be applied to the leftward end of the cylinder immediately or, if desired, it may be applied upon receiving a signal from further control means. This latter control apparatus may be of any conventional nature and needs no further description. Since there is no device to terminate application of pressure fluid upon rightward movement of the rod 46, movement of said rod will continue and the resulting counterclockwise motion of the pawl driver 34 will continue until such motion is stopped by cam 91.

When fluid pressure is applied to move rod 46 rightwardly and the fixture 47 is moved rightwardly against the pin 68, it rotates the pawl 6 about the pivot pin 62 in a counterclockwise direction and causes it to engage the next selected tooth, which tooth is offset in a clockwise direction from the tooth engaged in the preceding indexing operation. Simultaneously, pin 62, of the pawl driver 34 and the pawl 6 supported thereby are moved in a counterclockwise direction with respect to the shaft 12 with resultant sliding of the pin 68 in the slot 67 as said counterclockwise movement takes place.

Simultaneously with the alignment of the jaws 31 and 32 with the next selected tooth in a counterclockwise direction from the tooth which said jaws were aligned with at the commencement of the given cycle, the upwardly extending part 84 (Figure 3) becomes radially aligned with the next screw 76 which is located in a counterclockwise direction from that screw with which the upwardly extending part 84 was aligned at the beginning of the given cycle. As the counterclockwise motion of the pawl driver 34 takes place, there will be a corresponding counterclockwise motion of the pawl 6, the cam follower 73, the ratchet wheel 4, the table 2 and the flange 74, all thereof being associated together. The cam follower 73 will presently strike the surface 95 of the cam 91 and the cam follower will be urged radially inwardly thereby. The inward movement of the cam follower is stopped by the upward extending portion 84 of the cam structure 81 as it contacts the one of the screws 76 with which it is radially aligned. When inward motion of the cam follower 73 is stopped, its counterclockwise motion with respect to the base 1 is also simultaneously stopped. Where the cam 91 is pivotally mounted as shown in the embodiment illustrated in the drawings, the surface 94 of said cam is simultaneously caused to bear tightly against the inward surface of the flange 74 and act thereagainst as a brake in order to more quickly and completely stop the rotation of the table and parts associated therewith.

Therefore, the distance which the table can rotate in a counterclockwise direction when the pawl is engaged with any particular tooth of the ratchet wheel 4 is precisely controllable by the radially adjusted position of that one of the screws 76 which is operatively associated with the particular tooth of the ratchet wheel then being engaged by the pawl. Thus, by moving selected ones of the screws 76 radially inwardly and outwardly, the individual segments of the indexing motion of the table can be either lengthened or shortened as desired and the motion of the table may be circumferentially adjusted in any manner desired.

By making the distance which said motion can be lengthened or shortened with respect to any one tooth by adjustment of a screw 76 a distance equal to half the circumferential distance between adjacent teeth, a tool may be positioned at any point around the circumference of the table and the motion of the table and the work thereon can be adjusted to place the work in proper alignment with the tool.

By adjusting the stop 50 as desired from one of the grooves 45 to another, the clockwise rotation of the pawl driver 34 may be adjusted to cause a single reciprocation of the rod 46 to move the ratchet wheel 4 in increments of one tooth, two teeth, or more teeth as desired.

Figure 11:
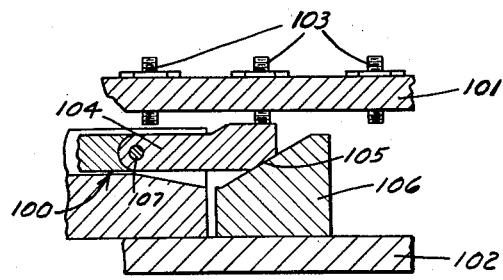
Figure 11 illustrates a modification of the invention.

Figure 11 shows a modification of the apparatus which will be found advantageous for certain purposes, particularly where it is desired to make the screws accessible from the upper side of the table. The table 101 is mounted for rotation on a base 102 in a manner generally similar to that shown in Figure 1. The screws 103 are arranged in spaced relationship around the periphery of said table 101. The cam limit structure 100 has its cam follower 104 mounted on a pivot 107 so that its cam engaging end 105 is movable in a vertical direction. The cam 106 is mounted on the base 102 and faces upwardly. The distance that the cam follower 104 can ride upwardly on said cam 106 as the table rotates is determined by the positions of the several screws 103. This controls the amplitude of rotational movement on the table 101 in the same manner as above described for the embodiment shown in the other figures.

While in the foregoing description, it has been emphasized that the indexing table embodying the invention is especially adaptable to indexing operations involving unequal indexing increments, and such is a primary purpose of the invention, it should nevertheless be clearly understood that the apparatus is by no means limited to indexing in unequal increments. Rather, it is also well adapted to indexing in equal increments with the capacity of the apparatus for adjustment being utilized for adjustment for the mechanism as required to maintain the spacing in predetermined increments as desired. In other words, the apparatus permits free adjustability of the indexing increments whether equal or unequal as desired and change from any indexing pattern to any other indexing pattern can be carried out rapidly, accurately and easily as desired.

Although particular, preferred embodiments of our invention have been disclosed hereinabove for illustrative purposes, it will be understood that variations or modifications thereof which do not depart from the scope of such invention, and the above disclosure thereof, are fully contemplated unless specifically stated to the contrary in the appended claims.

What is claimed is:

1. A device for rotating an indexing table through an adjustable arc of rotation, comprising in combination: a base and means rotatably mounting said table thereon; a ratchet associated with said table and rotatable therewith; a pawl engageable with said ratchet for effecting intermittent rotation thereof; a cam having a cam surface lying at an angle to the peripheral edge of said table; cam follower means oscillatable with said pawl and engageable with said cam surface for being moved with respect to said table by said cam surface; limit means on said table limiting the distance said cam follower can be moved by said cam surface with respect to said table whereby rotation of said table may be blocked when said cam follower means engages said limit means, said limit means being variable from place to place around the periphery of said table whereby the distance said cam follower can follow the cam surface may be limited as desired at different points around the periphery of said table and the distance said table can rotate in response to a single cycle of actuation of said pawl can be varied as desired at different points around the periphery of said table.

2. A device for rotating an indexing table through an adjustable arc of rotation, comprising in combination: a base and means rotatably mounting said table thereon; a ratchet associated with said table and rotatable therewith; a pawl engageable with said ratchet for effecting intermittent rotation thereof; a cam pivotally mounted on said base and having a first cam surface which is transverse to the surface of said table and substantially parallel with the peripheral edge of the table and a second cam surface which is transverse to the surface of said table and lies at an angle of less than 90° to the radius of said table passing through said second cam surface; cam follower means oscillatable with said pawl and engaging said second cam surface and limit means on said table limiting the distance said cam follower can follow said second cam surface; said limit means being variable from place to place around the circumference of said table, whereby the distance said cam follower can follow the second cam surface may be limited as desired at different points around the circumference of said table and the distance said table can rotate in response to a single cycle of actuation of said pawl can be varied as desired at different points around the circumference of said table.

3. The device defined in claim 2 wherein said cam follower is mounted on said pawl for pivotal movement radially inwardly and outwardly of said table and for circumferential movement with said pawl; and said limit means includes a plurality of radially adjustable devices on said table, each thereof being paired, respectively, with one of the teeth of said ratchet, whereby radial adjustment of said devices will determine the radial position of said cam follower and thereby determine the rotational position of the ratchet tooth associated with a particular device at the moment when said cam follower engages said cam in such a manner as to prevent further rotation of said table.

4. The device defined in claim 3 wherein said devices comprise a plurality of radially ararnged screws, circumferentially spaced around the periphery of said table and means for holding said screws in an adjusted position.

5. The device defined in claim 3 including a reciprocable rod and control means controllably effecting reciprocation thereof, a fixture on said rod operatively engaging said pawl for effecting operative movement thereof upon reciprocation of said rod, and means actuating said control means in response to the position of said fixture.

6. A device for rotating an indexing table through an adjustable arc of rotation, comprising in combination: a base and means rotatably mounting said table thereon; a ratchet associated with said table and rotatable therewith; a pawl engageable with said ratchet for effecting intermittent rotation thereof; a cam supported on said base below said table and having a cam surface angled upwardly toward said table; a cam follower oscillatable with said pawl and movable upwardly for following said cam surface; a plurality of adjustable limit means extending downwardly through said table for limiting the distance said cam follower can follow said cam surface, said limit means being arranged in a circle concentric with said table; whereby the distance that said cam follower can follow said cam surface may be limited as desired at different points in the rotation of said table and the distance the table can rotate in response to a single cycle of actuation of said pawl can be determined as desired at given rotative positions of said table.

7. A device for rotating an indexing table through an adjustable arc of rotation, comprising in combination: a base and means rotatably supporting said table thereon; means defining a series of circumferentially spaced recesses on said table and arranged in a circle thereon; an intermittently movable pawl receivable in said recesses for effecting intermittent rotation of said table; a cam having a cam surface lying at an angle to the peripheral edge of said table; cam follower means oscillatable with said pawl and engageable with said cam surface for being moved with respect to said table by said cam surface; a plurality of limit means on said table individually engageable with said cam follower means for limiting the distance said cam follower means can be moved by said cam surface with respect to said table so that rotation of said table may be blocked; and means supporting said limit means for individual adjustment so that the distance said table can rotate in any given cycle of actuation of said pawl can be varied by adjusting the position on the limit means which said cam follower engages during such given cycle.

8. A device for rotating an indexing table through an adjustable arc of rotation, comprising in combination: a substantially horizontal base; an indexing table located above said base and means rotatably supporting said table on said base for rotation about a substantially vertical axis; means defining a series of equally spaced recesses arranged in a circle concentric with said axis and fixed with respect to said table and located therebelow; a pawl below said table and means for intermittently moving said pawl into said recesses and through an arc of limited extent to thereby intermittently index said table; a cam supported on said base and having a vertically extending cam surface which lies at an angle to the peripheral edge of said table; a cam follower connected to said pawl for oscillation therewith, said cam follower being engageable with said cam surface for being moved thereby substantially radially with respect to said table; a series of equally spaced, radially extending screws mounted on said table on the lower side thereof and arranged in a circle thereon, said screws being individually radially adjustable with respect to said table; limit means on said cam follower engageable with one of said screws during each cycle of actuation of the pawl to prevent further radial movement of said cam follower whereby rotation of said table may be blocked, the distance said table can rotate in any given cycle of actuation of said pawl being variable by adjusting the radial position of the screw which said limit means engages during such given cycle.

9. A device for moving an indexing table through a distance of adjustable length, comprising in combination; a base and means supporting said indexing table thereon for movement with respect thereto; means defining a series of recesses on said table spaced from each other in the direction of movement of said table with respect to said base; an intermittently movable pawl receivable in said recesses for effecting intermittent movement of said table with respect to said base; a cam having a cam surface lying at an angle to the direction of movement of said table with respect to said base; cam follower means movable with said pawl and engageable with said cam surface for being moved with respect to said table by said cam surface; a plurality of limit means on said table individually engageable with said cam follower means for limiting the distance said cam follower means can be moved by said cam surface with respect to said table so that movement of said table may be blocked; and means supporting said limit means for individual adjustment so that the distance said table can move in a given circle of actuation of said pawl can be varied by adjusting the position of the limit means which the cam follower engages during such given cycle.

No references cited.